(12) United States Patent
Paniconi et al.

(10) Patent No.: US 7,751,479 B2
(45) Date of Patent: Jul. 6, 2010

(54) METHOD AND APPARATUS FOR NONLINEAR MULTIPLE MOTION MODEL AND MOVING BOUNDARY EXTRACTION

(75) Inventors: Marco Paniconi, Campbell, CA (US); James J. Carrig, Jr., San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1355 days.

(21) Appl. No.: 11/125,422

(22) Filed: May 9, 2005

(65) Prior Publication Data

US 2005/0213660 A1 Sep. 29, 2005

Related U.S. Application Data

(63) Continuation of application No. 10/291,989, filed on Nov. 11, 2002, now abandoned.

(51) Int. Cl.
*H04N 7/18* (2006.01)
(52) U.S. Cl. .............................. 375/240.12; 375/240.14
(58) Field of Classification Search ................................. 375/240.07–240.18
See application file for complete search history.

(56) References Cited

U.S. PATENT DOCUMENTS

| | | | |
|---|---|---|---|
| 5,043,810 A | 8/1991 | Vreeswijk et al. | |
| 5,557,684 A | 9/1996 | Wang et al. | |
| 5,778,097 A | 7/1998 | Nickerson | |
| 5,894,526 A | 4/1999 | Watanabe et al. | |
| 5,903,672 A | 5/1999 | Yu | |
| 5,991,447 A | 11/1999 | Eifrig et al. | |
| 5,995,668 A | 11/1999 | Corset et al. | |
| 6,212,235 B1 | 4/2001 | Nieweglowski et al. | |
| 6,249,548 B1 | 6/2001 | Kleihorst et al. | |
| 6,400,831 B2* | 6/2002 | Lee et al. | ..................... 382/103 |
| 6,646,578 B1 | 11/2003 | Au | |
| 6,658,059 B1* | 12/2003 | Iu et al. | ................. 375/240.16 |
| 6,665,423 B1* | 12/2003 | Mehrotra et al. | ............ 382/107 |
| 7,092,550 B2* | 8/2006 | Xu | .............................. 382/107 |
| 2003/0169931 A1 | 9/2003 | Lainema | |

OTHER PUBLICATIONS

Zhang, Kui, et al., "Image Sequence Coding Using Multiple-Level Segmentation and Affine Motion Estimation", IEEE Journal on Selected Areas in Communications, vol. 15, No. 9, Dec. 1997, pp. 1704-1713.

Chang, M., et al., "Simultaneous Motion Estimation and Segmentation", IEEE Transaction on Image Processing, vol. 6, No. 9, Sep. 1997, pp. 1326-1333.

Zhang, Jun, et al., "Image Sequence Segmentation Using 3-D Structure Tensor and Curve Evolution", IEEE Transactions on Circuits and Systems for Video Technology, vol. 11, No. 5, May 2001, pp. 629-641.

(Continued)

*Primary Examiner*—Andy S Rao
(74) *Attorney, Agent, or Firm*—Blakely, Sokoloff, Taylor & Zafman LLP

(57) ABSTRACT

A method and apparatus for nonlinear multiple motion model and moving boundary extraction are disclosed. In one embodiment, an input image is received, the input image is partitioned into regions/blocks, and the new multiple motion model is applied to each region to extract the motions and associated moving boundaries.

18 Claims, 13 Drawing Sheets

OTHER PUBLICATIONS

Mansouri, A., et al., "Multiple Motion Segmentation with Level Sets", Proceedings of SPIE, Image and Video Communications and Processing 2000, vol. 3974, pp. 584-595.

Leymarie, F., et al., "Tracking Deformable Objects in the Plane Using Interative Affine Motion Estimation and Quadtree Segmentation", Proc. Int'l. Conf. on Digital Signal Processing-DSP95, Limasol, Cyprus, Jun. 1995 (6 pgs.).

Philippe Robert, Motion compensating interpolation considering occluding, appearing and disappearing areas, Signal Processing of HDTV III, Proceedings of the Fourth International Workshop on HDTV and beyond, Turin, Italy, Sep. 4-6, 1991, pp. 329-341.

Wang et al., Representing Moving Images with Layers, IEEE Transactions on Image Processing Special Issue: Image Sequence Compression, vol. 3, No. 5, pp. 1-13, Sep. 1994.

Borshukov et al., Motion Segmentation by Multi-Stage Affine Classification, Department of Electrical Engineering and Center for Electronic Imaging Systems, pp. 1-11.

Yaer Weiss, SMoothness in Layers: Motion segmentation using nonparametric mixture estimation, CVPR 97, pp. 520-527, Puerto Rico.

Bergen et al., Dynamic Multiple-Motion Computation, David Sarnoff Research Center, Artifical Intelligence and Computer Vision, 1991, pp. 147-156.

* cited by examiner

METHOD AND APPARATUS FOR NONLINEAR MULTIPLE MOTION MODEL AND MOVING BOUNDARY EXTRACTION

RELATED APPLICATIONS

This is a continuation of application Ser. No. 10/291,989, now abandoned, filed on Nov. 11, 2002.

FIELD OF THE INVENTION

The present invention pertains to image processing. More particularly, the present invention relates to estimation of object motion in images.

BACKGROUND OF THE INVENTION

Standard motion modeling for video coding involves parametric models, applied to a fixed region (motion block), to estimate the motion. These approaches are limited in that the models cannot handle the existence of multiple (different) motions within the motion block. This presents a problem.

A basic problem in motion estimation is the ability of the model to handle multiple motion and moving object boundaries. Standard motion models, such as the affine or perspective models, allow for smooth deformations of a region (i.e., the motion block) to capture a coherent motion (such as translation, zoom, rotation) for all the pixels in the motion block. The region or block over which the motion is estimated cannot be chosen to be to small; this is from (1) a coding point of view, since larger regions mean smaller motion overhead, and (2) from an estimation point of view, larger region allows for better estimation of motion parameters.

A key problem that arises, from the standard limitation of common motion models, is the occurrence of multiple motions within the motion block. A moving object boundary within a motion region is indication of two possibly very different motions (motion of the object and motion of say the background). Also, a moving object boundary implies that some pixels will be occluded (hidden) with respect to the past or future motion estimation. This occlusion effect can bias the motion estimate, lead to higher prediction error, and make it difficult to accurately extract the object boundary.

Approaches in motion segmentation often rely on optical flow estimates or parametric (i.e., affine) motion models; these will have the usual problems near object boundaries and occlusion effects. Some degree of smoothness in the segmentation field, and hence in object boundaries, can be achieved with a prior probability term in MAP/Bayesian methods. This is more of a constraint on the connectivity of the segmentation field, without any explicit coupled model to account for object boundary and motion fields. A curvature evolution model may be used to capture the boundary of a moving object. However, this approach does not involve motion estimations/field, and relies on a temporal difference operator in the model for the evolution of the object boundary.

In another approach, the context of a level set approach, implicitly models the contour of the object boundary and multiple affine motion fields, however, motion estimation is with respect to only one reference frame, i.e., motion of frame n is determined from n−1. As discussed above, this has problems. Some pixels close to the object boundary may be occluded; this will in turn bias the estimation of the boundary, since the motion field is not reliable near the boundary due to occlusion.

Thus, there are problems with the common motion models.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for nonlinear multiple motion model and moving boundary extraction are described.

The present invention involves a new motion model for estimation of object motion in video images. In one embodiment of the invention, a new motion model that involves nonlinear coupling between space and time variables is used, a type of region competition to separate multiple motions, and boundary modeling to extract an estimate of the moving object boundary. The model is compact and can be used in motion segmentation and/or video coding applications.

In another embodiment of the present invention, an extension of motion modeling has been used to account for the problems discussed in the background section. The basic features of this model are the following:

1) a time variable is introduced to allow for combined motion estimation with respect to the past and future frame;
2) multiple motions (2 motions or more) are allowed to coexist;
3) object boundary extraction (curvature of boundary incorporated), is determined from a type of region competition for boundary selection; and
4) a nonlinear function is used to control/refine the estimate of the object boundary.

The present invention is capable of handling multiple motions (two or more). However, to not unnecessarily obscure the present invention, the discussion will initially discuss two motions, with an extension to more than two motions described later in the specification.

One skilled in the art will appreciate that the use of the time variable allows the introduction of two motions and yet avoids occlusion effects. If some pixels close to a moving object boundary are, for example, hidden in the previous frame, then the motion region (to which these pixels belong) will tend to reference its motion with respect to the future (and vice-versa) to reduce prediction error. This is, in a sense, a type of "region competition", where the object boundary is obtained as the 2 motion regions compete to reduce their prediction error by selecting either past or future as their reference frame for motion estimation. Therefore, the moving object boundary in our model is determined implicitly from this type of region competition. This is in contrast to models that explicitly introduce a contour model (i.e., active contour models); these methods can have significant problems with discretization of the contour and control of the length/curvature as the contour evolves.

Figure 3:
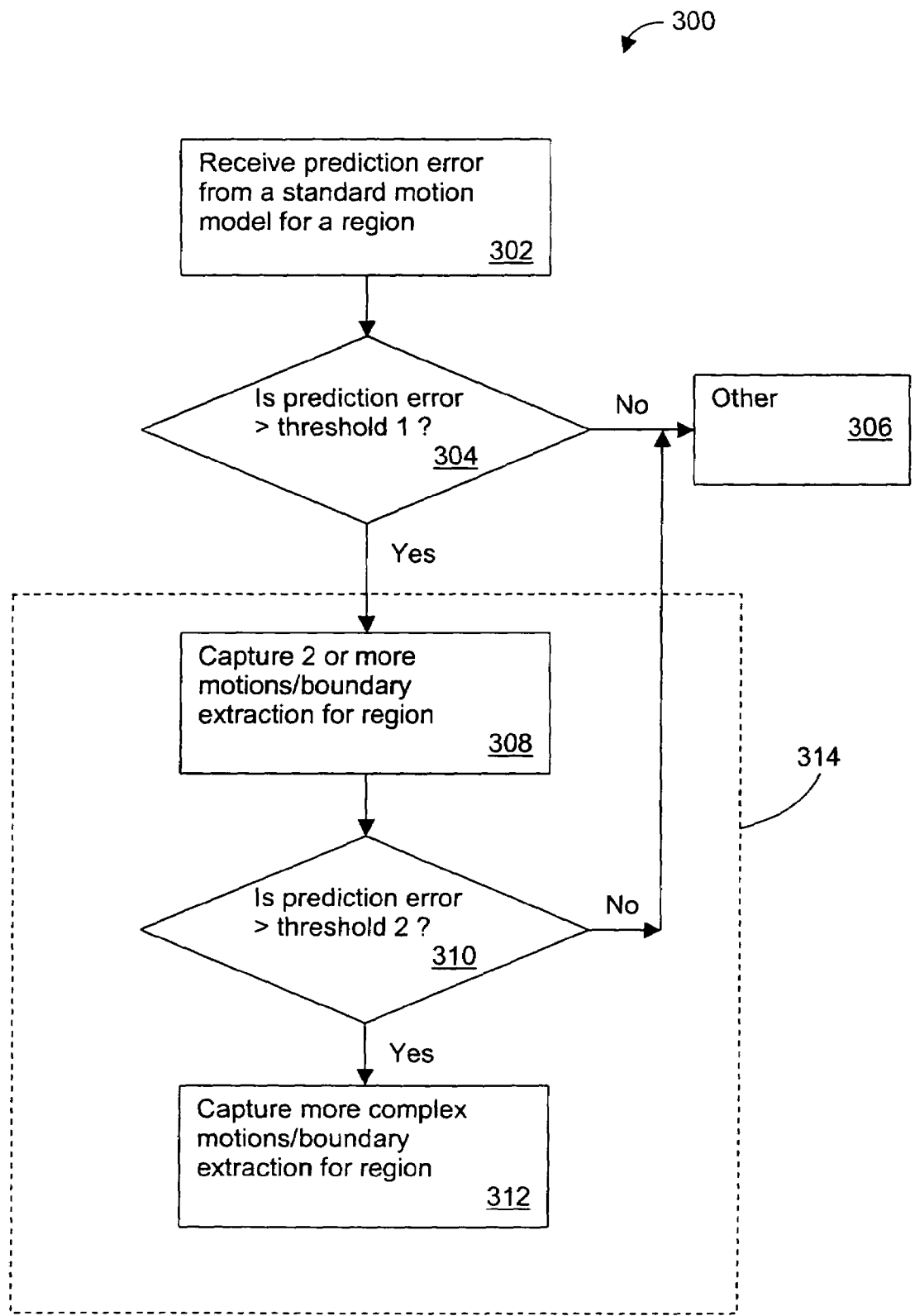
FIG. 3 illustrates one embodiment of the invention in flow chart form.

In one embodiment of the invention, the motion model is applied locally to a region/block in an image, and it may be viewed as part of a refinement stage to motion estimation or motion segmentation. That is, if after one pass of a motion estimation/segmentation algorithm of an image (say initially using a standard affine motion model) the prediction error in some region is above some quality threshold, then an embodiment of the present invention motion model may be applied to those regions. FIG. 3 illustrates the process in flow chart form 300.

At 302 the prediction error from a standard motion model for a region is received. At 304 a determination is made as to whether the prediction error (received from 302) is greater than a first preset threshold. If the prediction error (from 302) is not greater than the first threshold then other 306 processing may be done. If the prediction error is greater than the first threshold then at 308 is captured 2 or more motions and the associated boundary for extraction for the region. Next, at 310 a check is made to determine if the prediction error (from 308) is greater than a second preset threshold. If the prediction error (from 308) is not greater than the second threshold then other 306 processing may be done. If the prediction error is greater than the second threshold then at 312 is captured more complex motions and the associated boundary for extraction for the region. In dashed block 314 is where some of the techniques of the invention are performed.

In another embodiment of the invention, an extension in the motion model may be used for true non-rigid deformation of object boundary. For example, box 312 in FIG. 3 may also refer to a more complex model to handle true non-rigid deformation. An extension such as a boundary-to-boundary matching can be used and incorporated in the structure illustrated in FIG. 3.

For a video coding application, simple segmentation (for low overhead) of a motion block/region to capture multiple motions (to reduce prediction error) may be achieved with quadtree segmentation of blocks, where large prediction error blocks are partitioned in sub-blocks for improved motion estimation. Similarly, blocks with large prediction errors may be quadtree segmented with a straight line model of the boundary/partition. In one embodiment of the invention, the approach is more aligned with the motion segmentation problem itself, which involves the ability to obtain good estimates of the location and local shape of the moving object boundaries.

Figure 4:
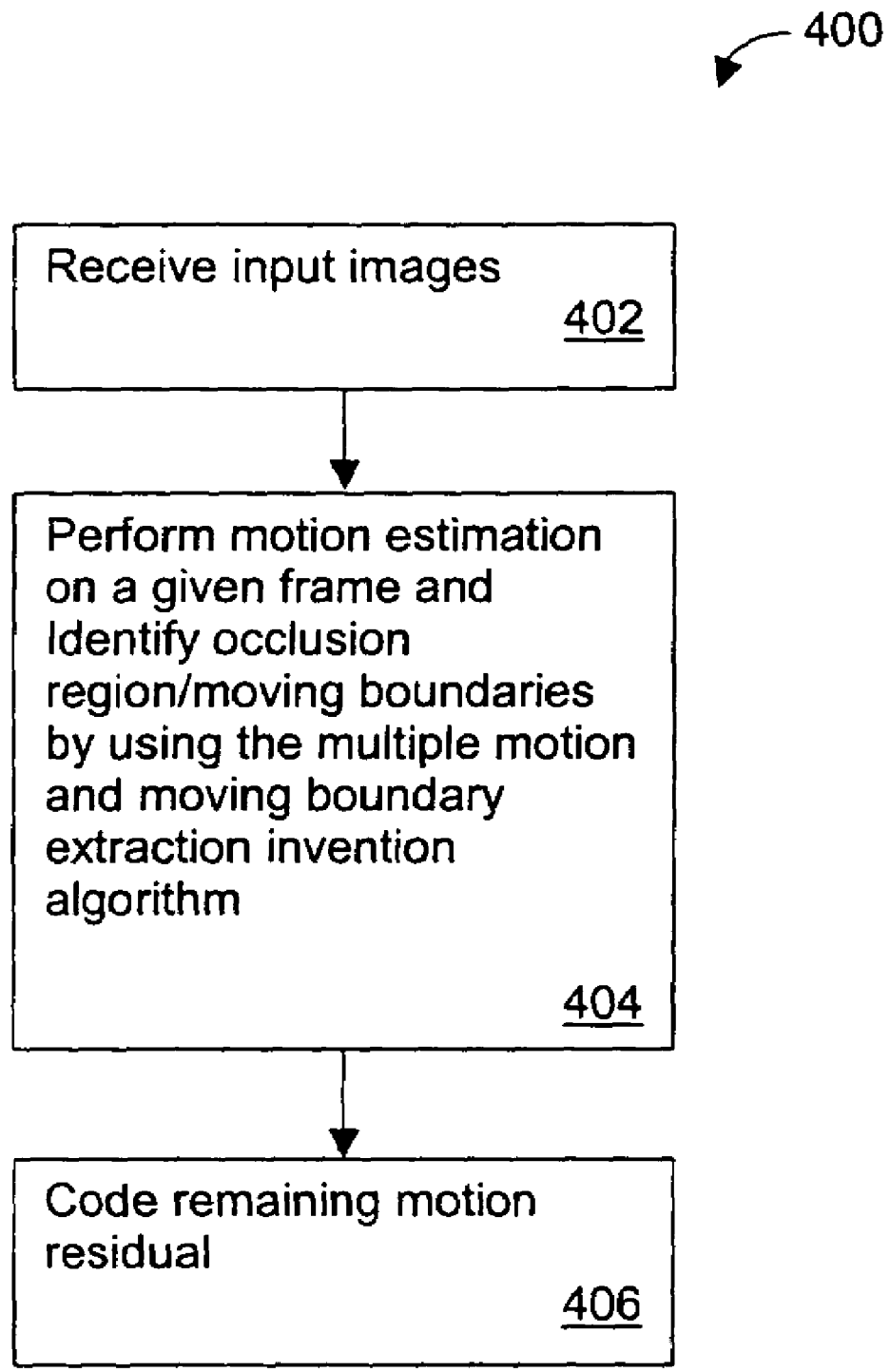
FIG. 4 illustrates in flow chart form one embodiment of video coding.

FIG. 4 illustrates in flow chart form 400 one embodiment of video coding. Here the motion model is used to estimate motion and remove temporal redundancy, resulting in a small motion residual to code. Discussed later are additional embodiments of the invention and how the motion model may be used efficiently and effectively for coding.

In FIG. 4, at 402 the input images are received. At 404 motion estimation is performed on a given frame and occlusion regions and moving boundaries, using the multiple motion and boundary extraction invention, are identified. At 406 the remaining motion residual is coded.

In an embodiment of the invention, the time variable is used for representation of 2 motions. In the motion model, simultaneous estimation with respect to past and future is used (i.e., 2 reference frames are used), so that pixels close to the boundary that are occluded in, say the past frame, will choose estimation from the future frame (where they are not occluded), and vice-versa. It is this duality of occlusion that is exploited in the model.

In an embodiment of the invention, a nonlinear aspect is used on the time variable (and hence boundary model) to control and refine the estimation of the boundary interface.

In an embodiment of the invention, the extended motion model may be used locally, and as part of a successive iterative approach, as illustrated in FIG. 3. Regions that are deemed poor (because of high prediction error), say in a first pass of a segmentation process, may be re-estimated with the extended motion model to capture multiple motions and the moving boundaries.

As mentioned above, the boundary is defined implicitly through the time variable in the motion model, whose functional form allows for the motion domains to be defined by regions of smooth compact support.

A Standard Model Review

In order for the reader to more quickly and fully understand embodiments of the present invention, a review of a standard motion model is presented. A standard motion model often used in motion estimation is the affine model, which takes the following form:

$$x' = v^x(x,y) = ax + by + c$$

$$y' = v^y(x,y) = dx + ey + f$$

where (x',y') is the pixel location on the reference frame (i.e., previous frame). If (a=e, d=−b) then only translation, zoom, and rotation motion are allowed; these are the dominant modes in most cases. Nonlinear perspective models is an extension of the affine model to 8 parameters to handle projection into the image plane. The motion models are applied over some region (motion block), and estimation of the parameters can involve linear least squared projections, direct minimization of prediction error, multi-resolution minimization of prediction error, etc.

Motion Model

Embodiments of the invention include a model to account for multiple motions and estimation of moving object boundaries. Past and future motion estimation is used. This involves the use of the time variable t' (t'=−1 for motion estimation based on past frame, and t'=0 for motion estimation based on future frame). The model for 2 motions (more general case discussed later) takes the following form:

$$t' = F(s)$$

$$s = B(x,y)$$

$$x' = v_1^x(x,y) + (v_2^x(x,y))(t'+1)$$

$$y' = v_1^y(x,y) + (v_2^y(x,y))(t'+1) \tag{1}$$

where B(x,y) contains information on the boundary/interface model, and $\vec{v}_i = (v_i^x, v_i^y)$ are the motion model vector maps for the i=1, 2 motions.

For one realization of the model, we consider the model (i.e., smooth function of pixel coordinates)

$$s = B(x,y) = gx + hy + \alpha x^2 + \beta y^2 + i$$

where $\{g, h, \alpha, \beta, i\}$ are parameters to the model boundary curve.

We also take the standard affine motion models for $\vec{v}_i$, so the equation above becomes:

$$t' = F(s)$$

$$s = gx + hy + \alpha x^2 + \beta y^2 + i$$

$$x' = ax + by + c + (a'x + b'y + c')(t' + 1)$$

$$y' = dx + ey + f + (d'x + e'y + f')(t' + 1)$$

where $\{a, b, c, d, e, f, a', b', c', d', e', f'\}$ are parameters of the affine motion models.

The description of the model is as follows:

First, consider the last two equations above. These model the two motions, one is a 6 parameter affine motion, the other is another 6 parameter affine motion.

For pixels with $t' = -1$, the motion vector is given by:

$$v_x = x' - x = (a-1)x + by + c;$$

$$v_y = y' - y = dx + (e-1)y + f$$

For pixels with $t' = 0$, the motion vector is given by:

$$v_x = (a + a' - 1)x + (b + b')y + c + c'$$

$$v_y = (d + d')x + (e + e' - 1)y + f + f'$$

The coupling to the time variable allows for the presence of 2 different motions in this embodiment (i.e., with different translation, rotation, and zooming). The partition of the motion region into 2 motions is defined according to whether the region uses a past or a future frame for motion estimation. This is shown in FIG. 5.

Figure 5:
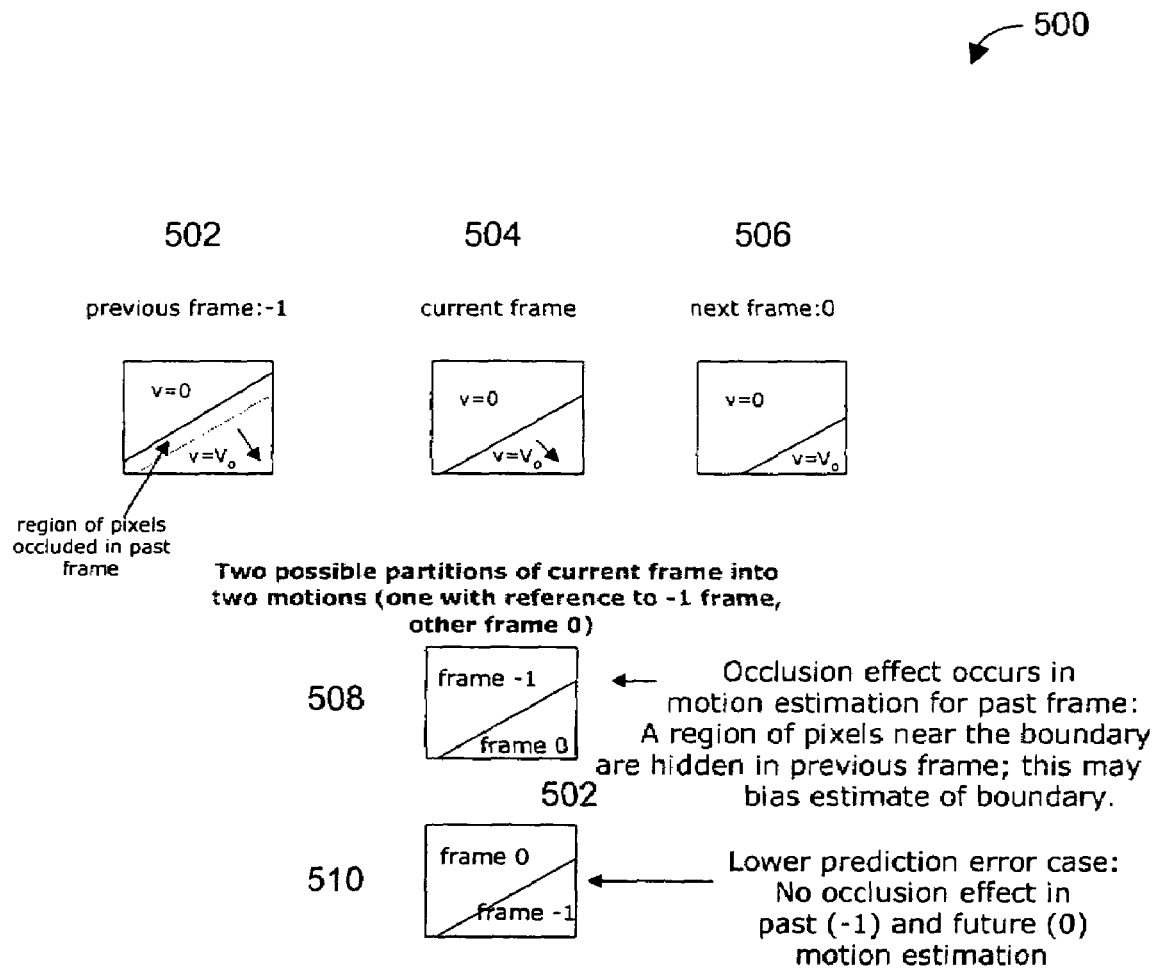
FIG. 5 illustrates one embodiment of motion segmentation into 2 regions.

In FIG. 5 motion segmentation into 2 regions is obtained by the region's frame reference for motion estimation. The object moving with velocity $V_o$ is the foreground object in this example. The model is determined by minimizing the prediction error (for both past and future reference frames). The lowest prediction error should result in the bottom partition (510), which avoids any occlusion effect, and hence has the best potential for locating the true moving boundary. 502 is the previous frame, 504 the current frame, and 506 is the future or next frame. 508 is one possible partition of the current frame into two motions. 510 is another partition of the current frame into two motions and is the lower prediction error case when compared with the 508 partition.

The time variable in Equation (1) is a smooth function of the pixel locations, and varies from $-1$ to $0$. Operationally, a given pixel location in the motion block on the current frame defines the time variable $t'$. This time variable is then used in the last 2 equations to determine the motion vectors. The prediction is then formed by referencing the motion vector to a pixel location that lives on a frame at time $t'$; if $t' = 0$ a future frame is used in prediction, if $t' = -1$ a past frame is used. For $t' \in (-1, 0)$, a linear combination of past and future frames are used.

The time variable controls the motion of the object boundary. The boundary is defined to be where $s = -0.5$, which in general is a curve described by a polynomial $gx + hy + \alpha x^2 + \beta y^2 + i = -0.5$. The smoothness of the interface model allows each motion region to be defined by a smooth compact support. The nonlinear function F is chosen to be representative of the boundary, in the sense of saturating to 0 or $-1$ away from the interface, along with the condition $t' = F(-0.5) = -0.5$ defining the boundary. The nonlinear function $$F(s) = \frac{(\tanh((s + 0.5)/w) - 1)}{2}$$

achieves this feature, where w controls the slope at the boundary. Reference is made to the parameter w as the "width" of the boundary or interface. Some plots of the function F for different boundary widths are shown in FIG. 6.

Figure 6:
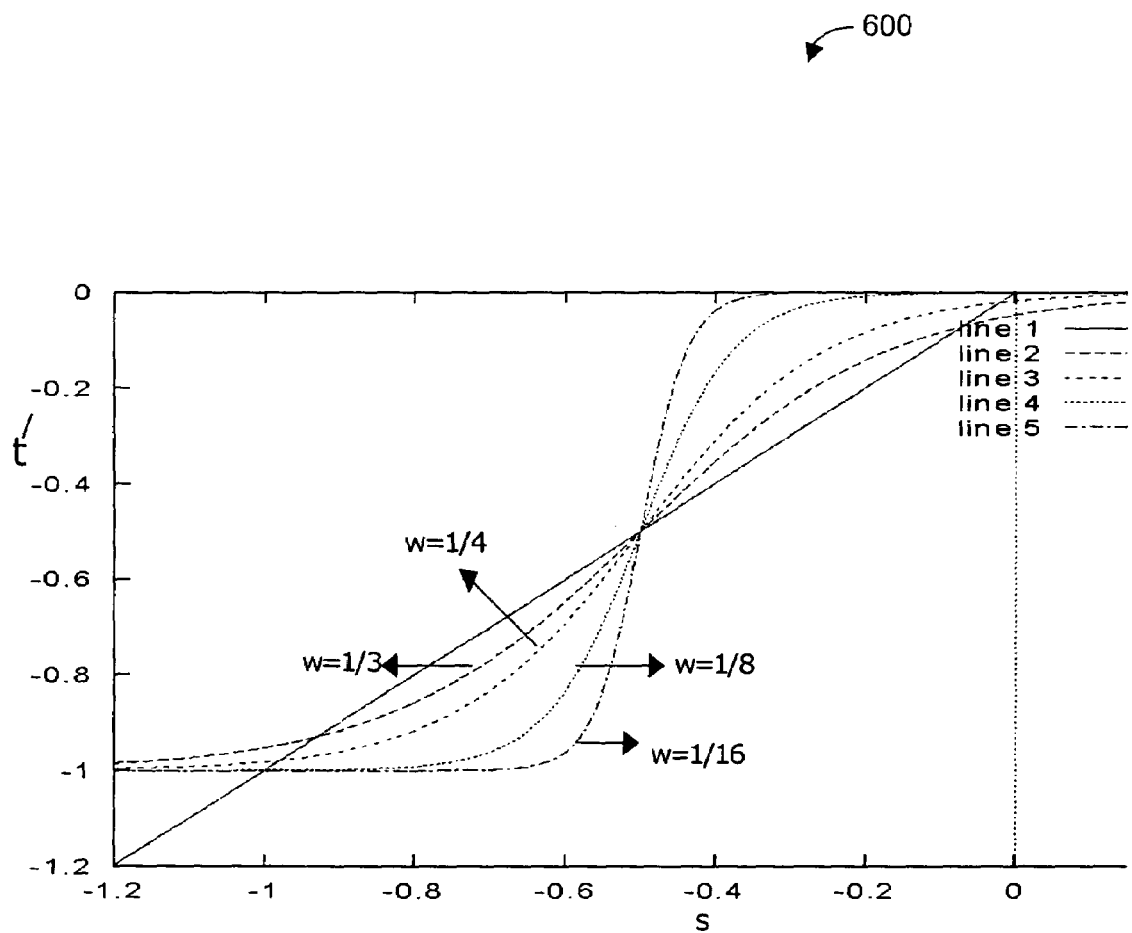
FIG. 6 illustrates the behavior of one embodiment of a function that controls the time reference assignment of pixels.

As shown in FIG. 6, is the behavior 600 of the function $t' = F(s)$ used in one embodiment of the motion model. The function controls the assignment of pixels to past ($t' = -1$) or future ($t' = 0$) reference frames for motion estimation, with the object boundary defined at $s = -0.5$. This function is characterized by a width parameter (w) and appropriately saturates at $-1$ and $0$.

A key feature in the model is the "boundary width" (w) that controls the spread of the time variable from $-1$ (past frame) to $0$ (future frame). Pixels near the boundary (defined by width w) are a type of mixture phase, i.e., linear combination of the 2 domains. That is, for a pixel within the boundary region, the prediction is:

$$I_{pred}(x,y) = (1+t')I^{future}(x',y') - t'I^{past}(x',y')$$

and a Mixture State can be defined as:

Mixture states: weight $(1+t')$ for domain 1, and weight $-t'$ for domain 2.

where $t' \in (-1, 0)$ (recall that time references the motion region/domain). In one embodiment of the invention, w itself may vary dynamically in the model. Then the system will naturally select the value w which would characterize the width/roughness of the boundary, and determine which pixels in the boundary layer are a mixture of the 2 domains.

Pure States:

In one embodiment of the invention to cleanly extract 2 (pure) domains with a fine boundary, w is fixed and small during the estimation step of the motion parameters. For example, the width parameter is fixed at $w = \frac{1}{3}$, and then re-estimation is performed using a successively finer interface width (as shown in FIG. 5). The nonlinear function $F(s)$ in the model and the decrease of w is used to control and refine the estimate of the boundary. As the interface width decreases, pixels away from the boundary become "frozen" with regard to their reference frame. Only the pixels in the vicinity of the boundary (determined by $s = -0.5$) are allowed to have their time variable change (i.e., migrate to the other reference frame), and hence modify the boundary.

Estimation of Model Parameters:

In one embodiment of the invention, the estimation of the motion model parameters is obtained from minimization of the prediction error.

$$e = \sum_{(x,y) \in motion\_block} (I(x,y) - I_{pred}(x,y))^2$$

$$I_{pred}(x,y) = (1+t')I^{future}(x',y') - t'I^{past}(x',y')$$

where (x',y',t') are functions of the model parameters (see Equation (1)). Note that for each pixel, the prediction is a linear combination of past and future frames; simple bilinear temporal interpolation may be used. The estimation of the model parameters may be obtained from a steepest descent algorithm using multiple resolution layers (described below).

The detail procedure of the estimation algorithm for the motion model proceeds as follows. There are 3 sets of initial conditions that may be used below:

(1) Motion parameters initialized with respect to a previous frame (2) Motion parameters initialized with respect to a future frame (3) The average of the motion parameters from set (1) and (2)

For each set, the interface parameters, in one embodiment, are chosen to be $g=h=\alpha=\beta=0$;

$i=-0.075, -0.5, -0.25$.

Thus a total of 9 initial conditions are used, although most often set 1 or 2 with $i=-0.5$ may be sufficient. The width parameter is kept fixed to $w=\frac{1}{3}$ for the sequence 1-7 below.

1. Initialization of Parameters:

For $\frac{1}{16}$ size image (obtained from simple decimation of original image), block matching (BM) is performed on small blocks in the corresponding motion block. For initial condition set 1, BM is done with respect to the past; with respect to the future for set 2. The set of motion vectors is then mapped onto the model parameters using Least Squares (LS). This yields an initial set of parameters (a, b, c, d, e, f) for initial condition set 1 and 2; the parameters (a', b', c', d', e', f') are initialized to 0. For the third initial condition set, the average of the parameters from set 1 and 2 are used.

2. Steepest descent is used on the $\frac{1}{16}$ size image to yield an estimate of the model parameters $\vec{V}^2$ ($\vec{V}^2$ denotes the component vector of all parameters in the model for layer 2 ($\frac{1}{16}$ size image)).

3. Projection from $\frac{1}{16}$ to $\frac{1}{4}$ size image to initiate estimation on $\frac{1}{4}$ size image. This projection is determined so as to preserve the functional form of the model under spatial scaling. For projection of motion parameters from layer 2 to layer 1, we have:

Layer Projection:

$a^1=a^2$ $b^1=b^2$ $c^1=2c^2$ $d^1=d^2$ $e^1=e^2$ $f^1=2f^2$ $g^1=0.5g^2$ $h^1=0.5h^2$ $i^1=i^2$ $\alpha^1=0.25\alpha^2$ $\beta^1=0.25\beta^2$ 4. Use the projected estimate from upper layer as an initial condition for level 1. Repeat iteration/steepest descent for $\frac{1}{4}$ size image. This yields an estimate $\vec{V}^1$.

5. Projection of parameters for $\frac{1}{4}$ to original size image, as in 3.

6. Repeat iteration/steepest descent estimation for full size image. Final solution is $\vec{V}^o$.

7. Repeat 1-6 for the set of initial conditions stated above.

8. Select the estimate of parameters from the set of initial conditions with lowest prediction error. Re-estimate the motion parameters using the best $\vec{V}^o$ as initial condition, but with a successively sharper width parameter w ($\frac{1}{4}$, $\frac{1}{8}$, $\frac{1}{16}$). This leads to an improved estimate of the position and curvature of the moving object.

EXAMPLES

Some examples of the motion model are illustrated here. In the first set of examples, the motion model was applied to a region (80×80 block) which contains 2 motions. For the examples, the original image is shown on the left, and the right image shows the segmentation of a multiple motion region into 2 regions. The dark region references the past frame, and the white region references the future frame. Note that in each example the segmentation into past/future regions is consistent with the effect of occlusion being minimized, as discussed, and shown in FIG. 5.

Figure 7:
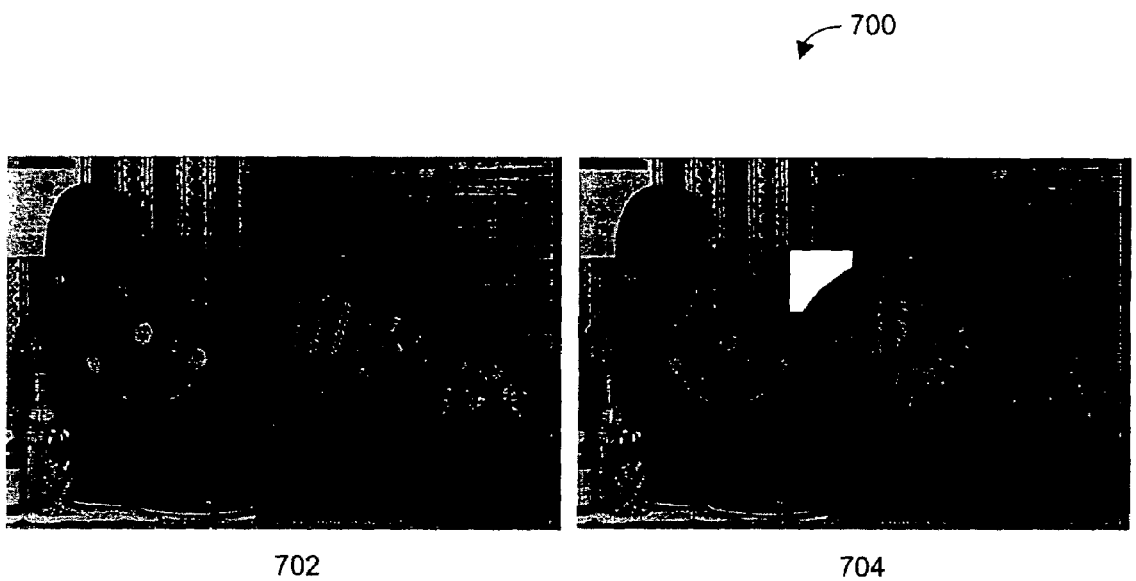
FIG. 7, FIG. 8, and FIG. 9 are examples illustrating how embodiments of the invention motion model, applied to a local block region, achieve separation into past and future motion references, and hence the extraction of the moving boundary is captured.

Example 1 is shown in FIG. 7. The fan moves to the right. Curvature of the fan object is captured, and the motion model achieves separation into past and future motion references as discussed, and shown in FIG. 5. 702 is the original image, and 704 shows the segmentation of a multiple motion region into 2 regions. The dark region references the past frame, and the white region references the future frame.

Figure 8:
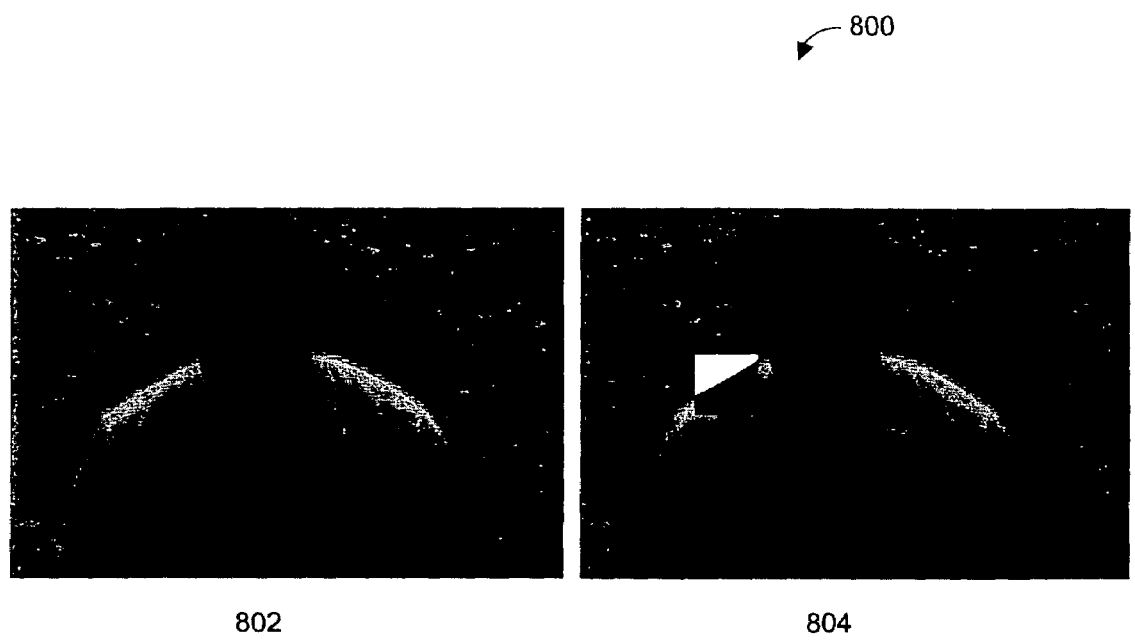

Example 2 is shown in FIG. 8. Here, the man moves downwards. This is the same effect as in the previous example. 802 is the original image, and 804 shows the segmentation of a multiple motion region into 2 regions. The dark region references the past frame, and the white region references the future frame. The frame reference assignment is such that occlusion effect is minimized, as discussed in FIG. 5.

Figure 9:
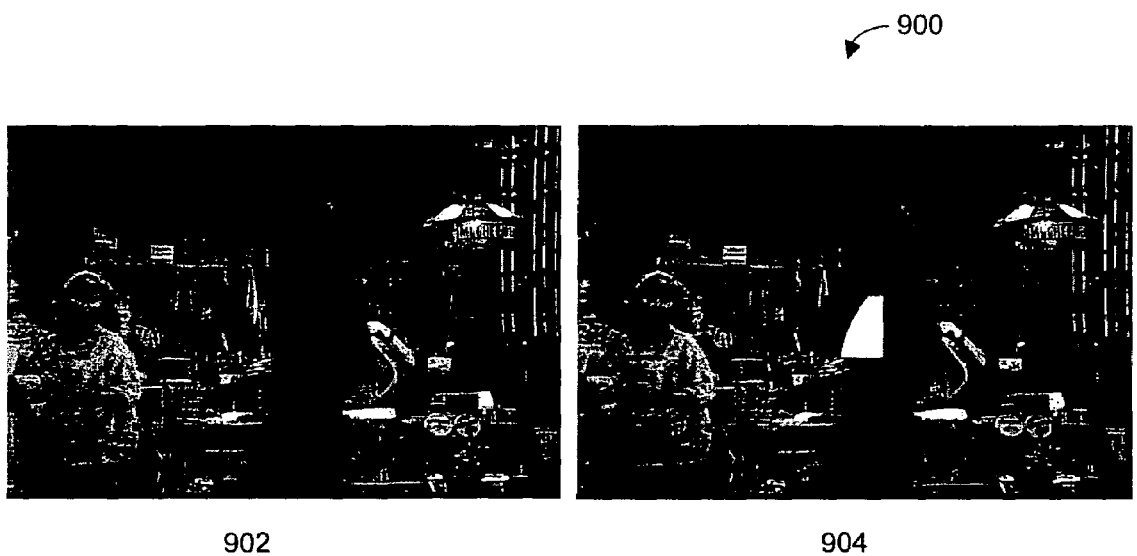

Example 3 is shown in FIG. 9. The girl in the foreground moves to the left. Because the girl moves to the left, the stationary region in front of her will prefer motion estimation with respect to the past where no occlusion occurs. 902 is the original image, 904 shows the segmentation of a multiple motion region into 2 regions. The dark region references the past frame, and the white region references the future frame.

For the above examples the prediction error data was calculated as the mean square error between the motion predicted region/block and the original block. The standard motion model refers to a single motion affine model, often used in motion estimation. The new motion model refers to an embodiment of the invention. As shown below, there is an improvement in prediction error using the new motion model.

|  | Standard motion model | New motion model |
|---|---|---|
| Example 1 | 26.8 | 9.1 |
| Example 2 | 22.0 | 8.6 |
| Example 3 | 18.9 | 5.5 |

Motion Model Applied to Large Region

In the example below, a large region around the objects of interest was partitioned into 80×80 blocks. This region was obtained from a standard type of motion segmentation (affine motion model and k-means clustering), with poorly labeled blocks (blocks with high prediction error and/or high distortion classification) identifying the regions of moving objects. Next, an embodiment of the invention new motion model was applied to a set of 80×80 blocks covering a large region around the moving object of interest. Example 4 is shown in FIG. 10 where the thin black line 1002 is the estimation of location of the boundary using the new motion model.

Figure 10:
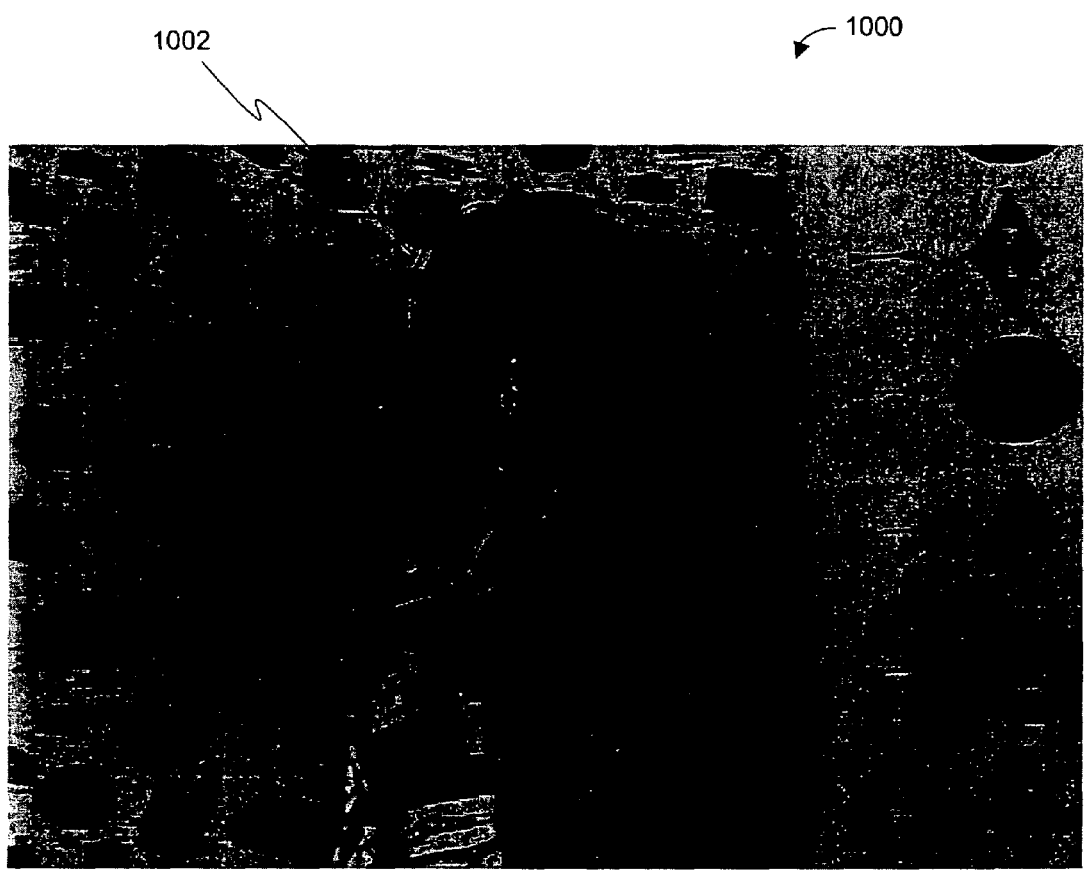
FIG. 10 is an example illustrating how an embodiment of the invention motion model estimated the location of a moving boundary.

In Example 4 as shown in FIG. 10, the girl walks to the right, the background "moves" to the left. The motion model is applied to a large region around the girl. The black lines around the girl (1002) is the extracted location of the moving object. The missing contour along her nose/face closely coincides with the boundary of one of the 80×80 blocks; thus most of the pixels in that block belong to one motion (face motion), and so the system selected one domain/state with no boundary.

Figure 11:
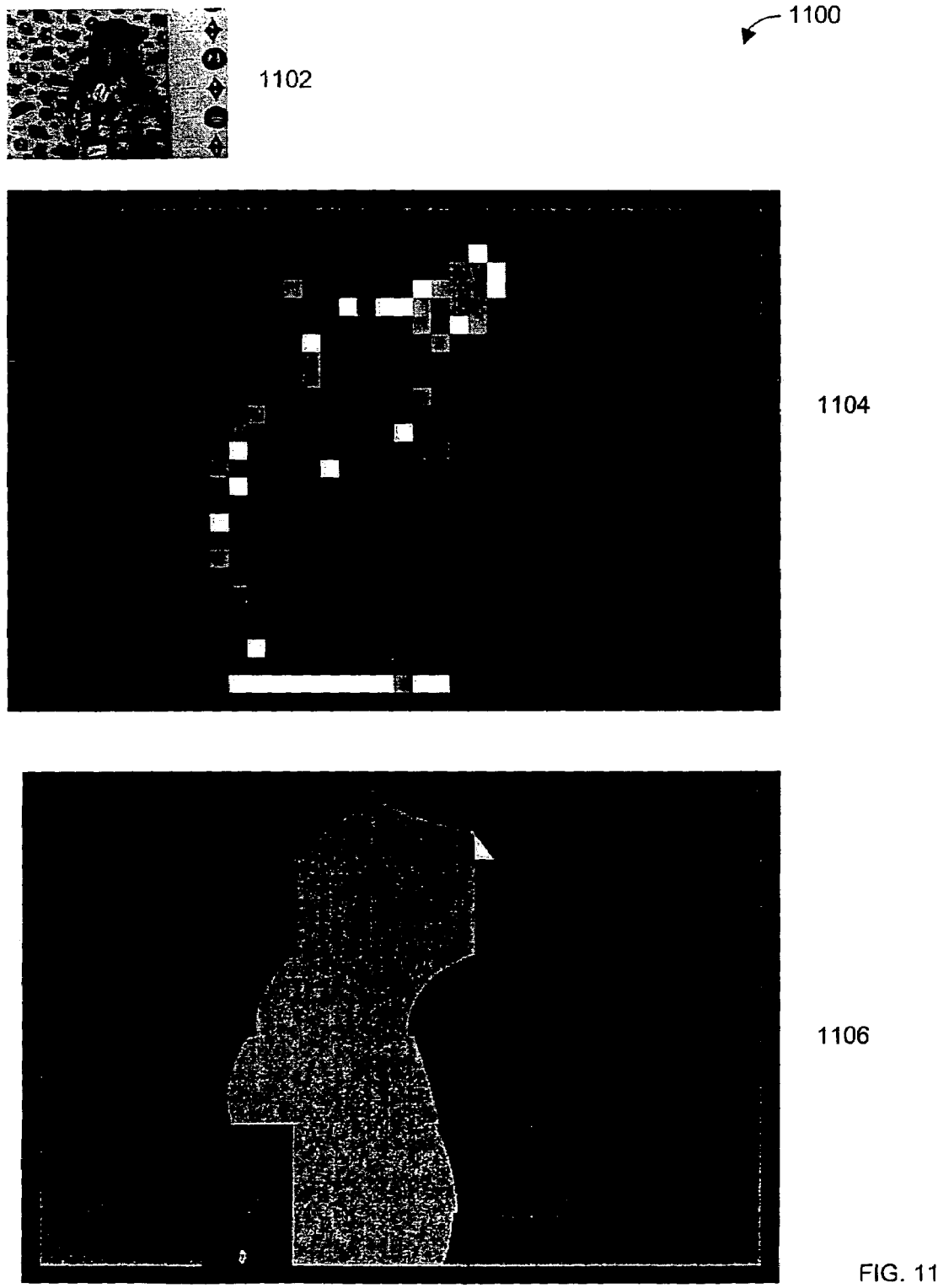
FIG. 11 is an example illustrating the comparison between a standard motion model and an embodiment of the invention motion model.

Shown in FIG. 11 is a comparison between a segmentation using an affine motion model (standard motion model) 1104, and the improvement using the new model 1106 as disclosed in one embodiment of the invention. The small picture 1102 is the original image. The image 1104 is the segmentation map derived from a standard method using affine motion models. Different shades refer to different motion classes. The image 1106 is the new segmentation map obtained by re-estimating the motion with the new motion model. Image 1106 shows a better outline of the girl in the image, and a smoother segmentation field than does image 1104.

Video Coding

In another embodiment of the invention, video coding may make use of the new motion model. The model discussed above, by virtue of its ability to account for 2 motions, can be applied to a large region. In the examples discussed previously, 80×80 blocks were used. The new motion model may be viewed as "compactly" representing different motions and boundary information. For example, in one embodiment of the invention, the present model has 17 parameters, and if used in say 80×80 blocks (in a 704×484 image), is about 900 motion parameters; this includes all information necessary for a decoder to extract motion field and locations of some moving boundaries. Compare this to the approximately 2662 parameters needed for a very simple standard 16×16 Block Matching Algorithm (2 translation parameters, with no explicit moving boundary information).

Model for M Motions

As was mentioned previously, the discussion above primarily focused on 2 motions so as to not obscure embodiments of the invention. Other embodiments of the invention may account for an arbitrary number of motions (M) and may be applied to extend the examples and embodiments discussed above.

An extension of the 2 motion model to account for M motions with non-intersecting boundaries can be written in the form (this is an extension of Equation (1)):

$$\vec{x}' = \sum_{i=1}^{M} \frac{g_i(t')}{g_i(t_i^{ref})} \vec{v}_i(x, y)$$

$$g_{i+1}(t') = \prod_{\substack{j=1...M \\ (j \neq i)}} (t' - t_j^{ref})$$

$$g_1(t') = 1$$

$$t' = F(\{s_j\}, \{w_j\}, \{t_i^{ref}\})$$

$$s_j = B_j(x, y)$$

where, as in Equation (1) above, we can use the model equations below as:

$$s_j = B_j(x,y) = g_j x + h_j y + \alpha_j x^2 + \beta_j y^2 + i_j,$$

and $$\vec{v}_i(x,y) = (a_i x + b_i y + c_i, d_i x + e_i y + f_i).$$

Figure 13:
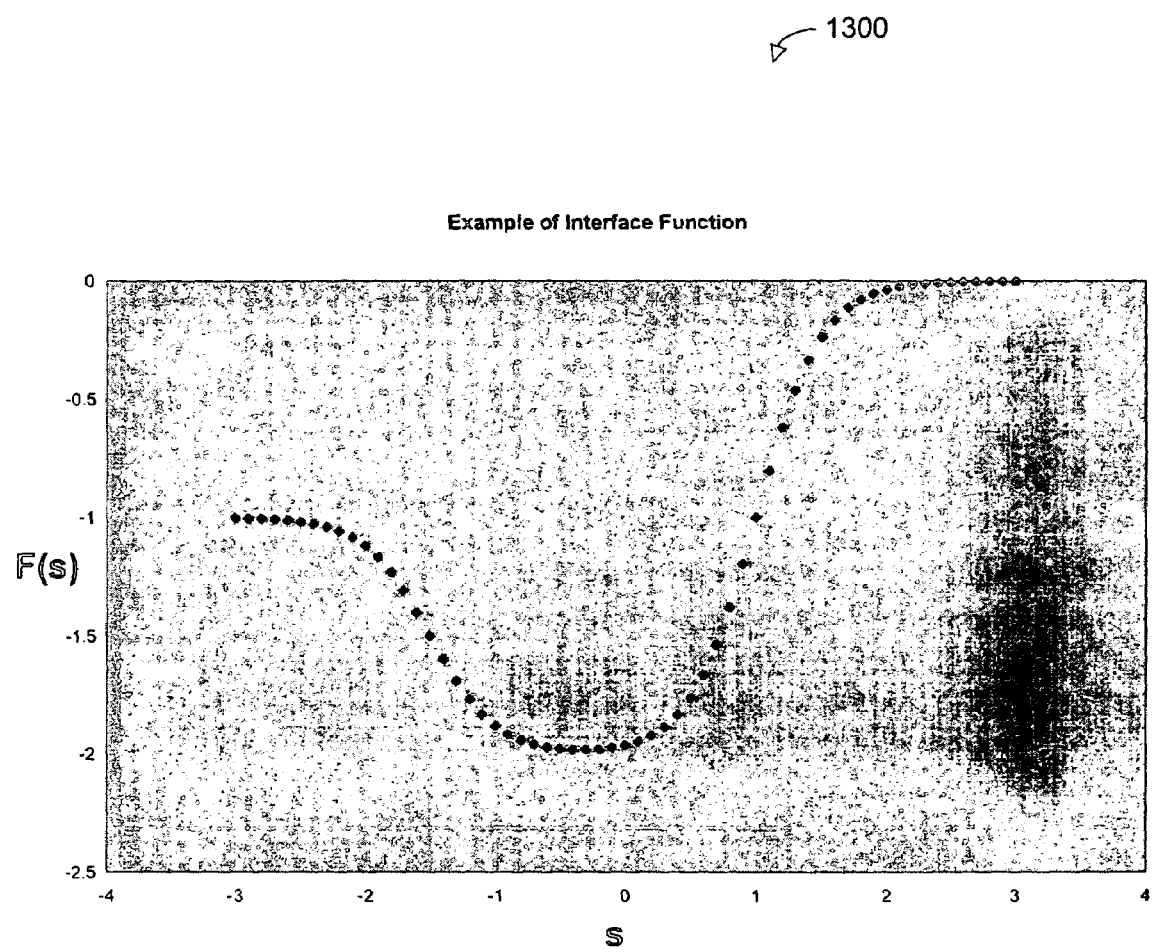
FIG. 13 illustrates the behavior of one embodiment of an interface function which controls the time reference assignment for 3 motions.

In the above model, $\vec{x}$ refers to a pixel position on the current frame (the one whose motion is being estimated), $\vec{x}'$ refers to a position on the reference frame, $\{t_i^{ref}\}$ are the M reference frames used for extraction of M motions. The motion vectors $\{\vec{v}_i\}$ are affine motion fields, t' is the continuous time variable, and $F(\{s_j\}, \{w_j\}, \{t_i^{ref}\})$ is the nonlinear function (example for one interface is shown in FIG. 13), representing the boundaries. This function involves the interface equations $\{s_j, j=1, \ldots M-1\}$ for M−1 boundaries, the M−1 width parameters $\{w_j, j=1, \ldots M-1\}$, and the reference times $\{t_i^{ref}, i=1, \ldots M\}$ (center of each boundary; middle point of F, see FIG. 6 for the 2 motion case) for the M motions. The interface equations $\{s_j\}$ are polynomials that model the location and shape of the boundary. The normalization of the weight function, $$\frac{g_i(t')}{g_i(t_i^{ref})},$$

is chosen to be 1 at i=1 (i.e., for $t_1^{ref}=-1$) to make correspondence with the case of 2 motions in Equation 1.

Case of 2 Motions

The model above reduces to the case realized earlier (see Equation (1)). The 2 reference frames are $t_1^{ref}=-1$ (past), and $t_2^{ref}=0$ (future). The factors in front of the affine motion vectors are:

$$\frac{g_1(t')}{g_1(t_{1ref})} = 1, \frac{g_2(t')}{g_2(t_i^{ref})} = \frac{t'+1}{1}.$$

There is only one boundary/interface variable s, and one width variable w. The nonlinear time equation becomes:

$$t'=F(\{s_j\},\{w_j\},\{t_i^{ref}\})=F(s,w,t_1^{ref},t_2^{ref})$$

where, for example, the model used for 2 motions is:

$$F(s, w, t_1^{ref}, t_2^{ref}) = \frac{(\tanh((s - (t_1^{ref} + t_2^{ref})/2)/w - 1)}{2}.$$

3 Motions

Figure 12:
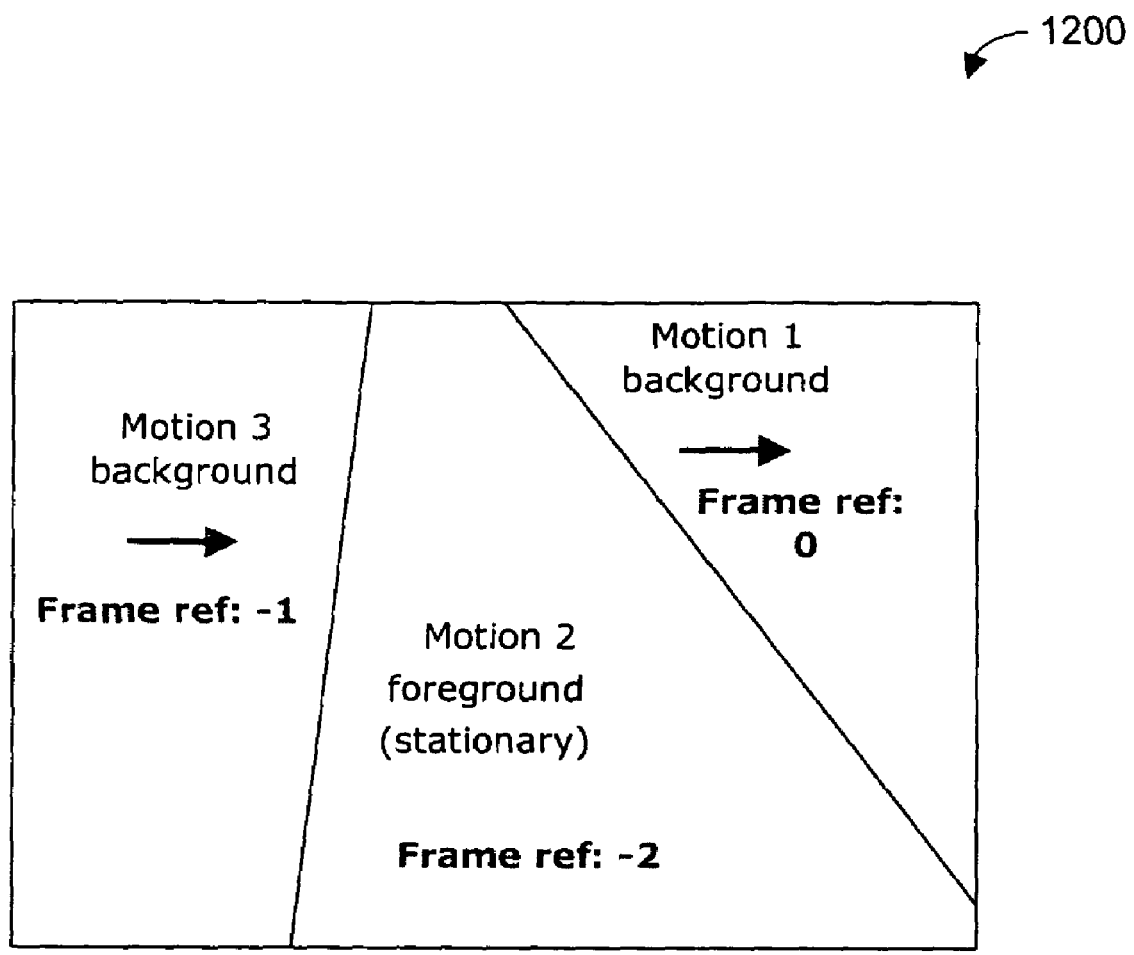
FIG. 12 is an example illustrating 3 motions, their movement, and lowest predicted error reference frames.

An example for 3 motions is shown in FIG. 12. Here, the three "motions" in the image region 1300 are the middle region, which is a stationary foreground, and the other 2 regions moving as indicated by the arrows. The 2 non-intersecting boundaries are shown as straight lines.

In order to minimize the occlusion/uncovered region effect, an optimal state (lower prediction error) will result in the region frame reference (Frame ref:) shown in FIG. 12. In this example, prediction relative to past (−1), future (0), and 2 frames deep in past (−2) was considered. An example of an interface function 1300 used in this example is shown in FIG. 13.

An example of an interface function for 3 motions (2 non-intersecting boundaries) is shown in FIG. 13. The function can be written as:

$$F(\{s_j\}, \{w_j\}, \{t_i^{ref}\}) = -0.5 \tanh\left(\frac{s_1 - (t_1^{ref} + t_2^{ref})/2}{w_1}\right) + \tanh\left(\frac{s_2 + (t_2^{ref} + t_3^{ref})/2}{w_2}\right) + 0.5$$

where $t_1^{ref}=-1$, $t_2^{ref}=-2$, $t_3^{ref}=0$, and $w_1$, $w_2$ are width parameters that characterize the smoothness/roughness of the boundaries (in the example above $w_1=0.25$, $w_2=0.25$). As discussed in the text for the 2 motion case, the width parameters $\{w_j\}$ may be fixed external parameters, however in general they may also be determined dynamically (which would allow the system to adjust or select the width/roughness of the boundary). As we discussed in Video Coding above, the invention may also be viewed as compactly representing multiple motions and boundary information. For an example of 3 motions, we would have about 30 parameters (6×3 for the 3 motions modeled by 6 parameter affine model, 5×2 for the 2 boundaries modeled by quadratic polynomial, and say 2 width parameters). However, since we can capture 3 motions, the block size could be increased to say 160×160 (instead of the 80×80 used in the 2 motion examples). This would still result in a coding gain compared to the conventional usage of 2 parameters for 16×16 blocks.

Thus what has been disclosed is a method and apparatus for nonlinear multiple motion model and moving boundary extraction.

Figure 1:
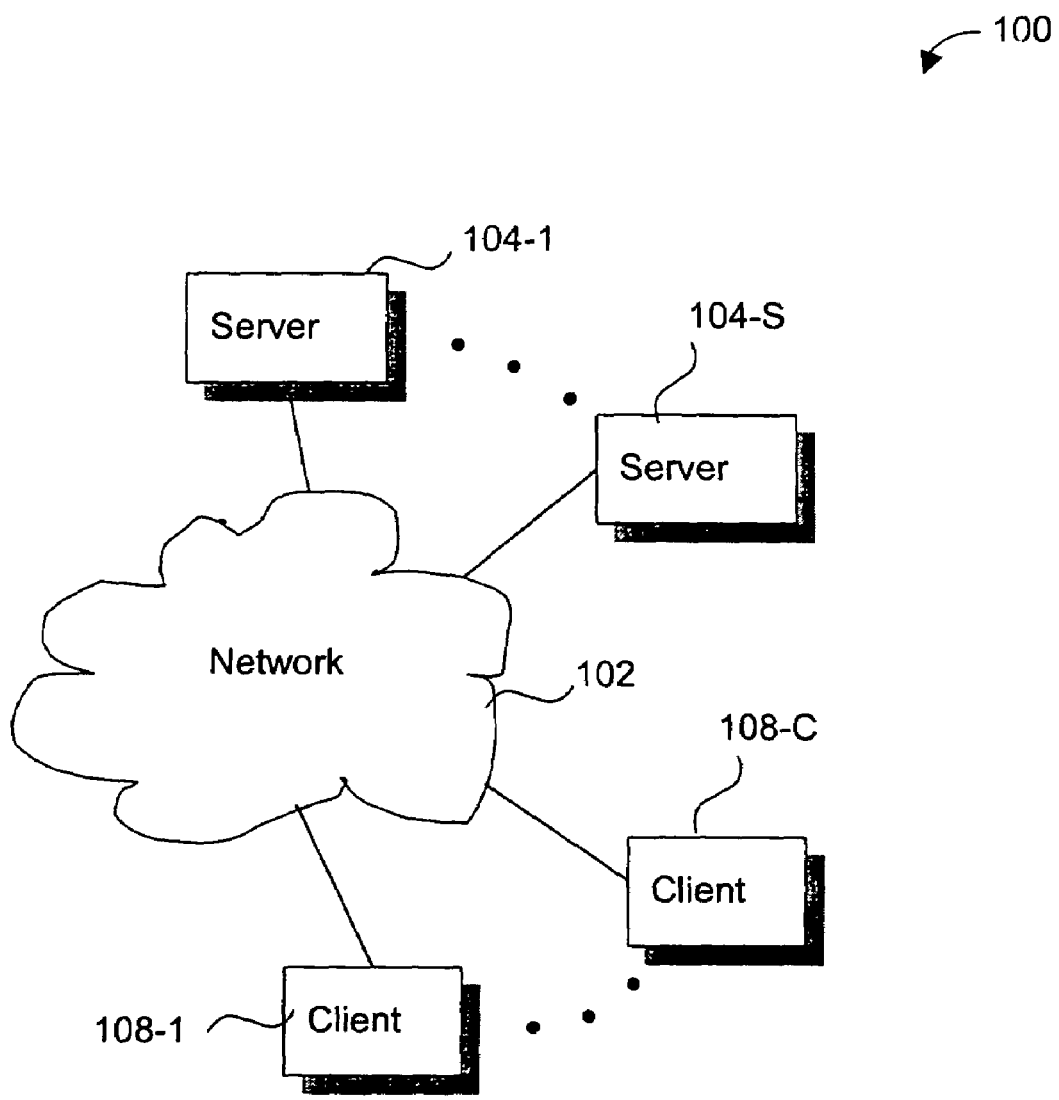
FIG. 1 illustrates a network environment in which techniques of the present invention may be used.

FIG. 1 illustrates a network environment 100 in which the techniques described may be applied. As shown, several computer systems in the form of S servers 104-1 through 104-S and C clients 108-1 through 108-C are connected to each other via a network 102, which may be, for example, a home-based network. Note that alternatively the network 102 might be or include one or more of: the Internet, a Local Area Network (LAN), Wide Area Network (WAN), satellite link, fiber network, cable network, or a combination of these and/ or others. The servers may represent, for example, disk storage systems alone or storage and computing resources. Likewise, the clients may have computing, storage, and viewing capabilities. The method and apparatus described herein may be applied to essentially any type of communicating means or device whether local or remote, such as a LAN, a WAN, a system bus, etc.

Figure 2:
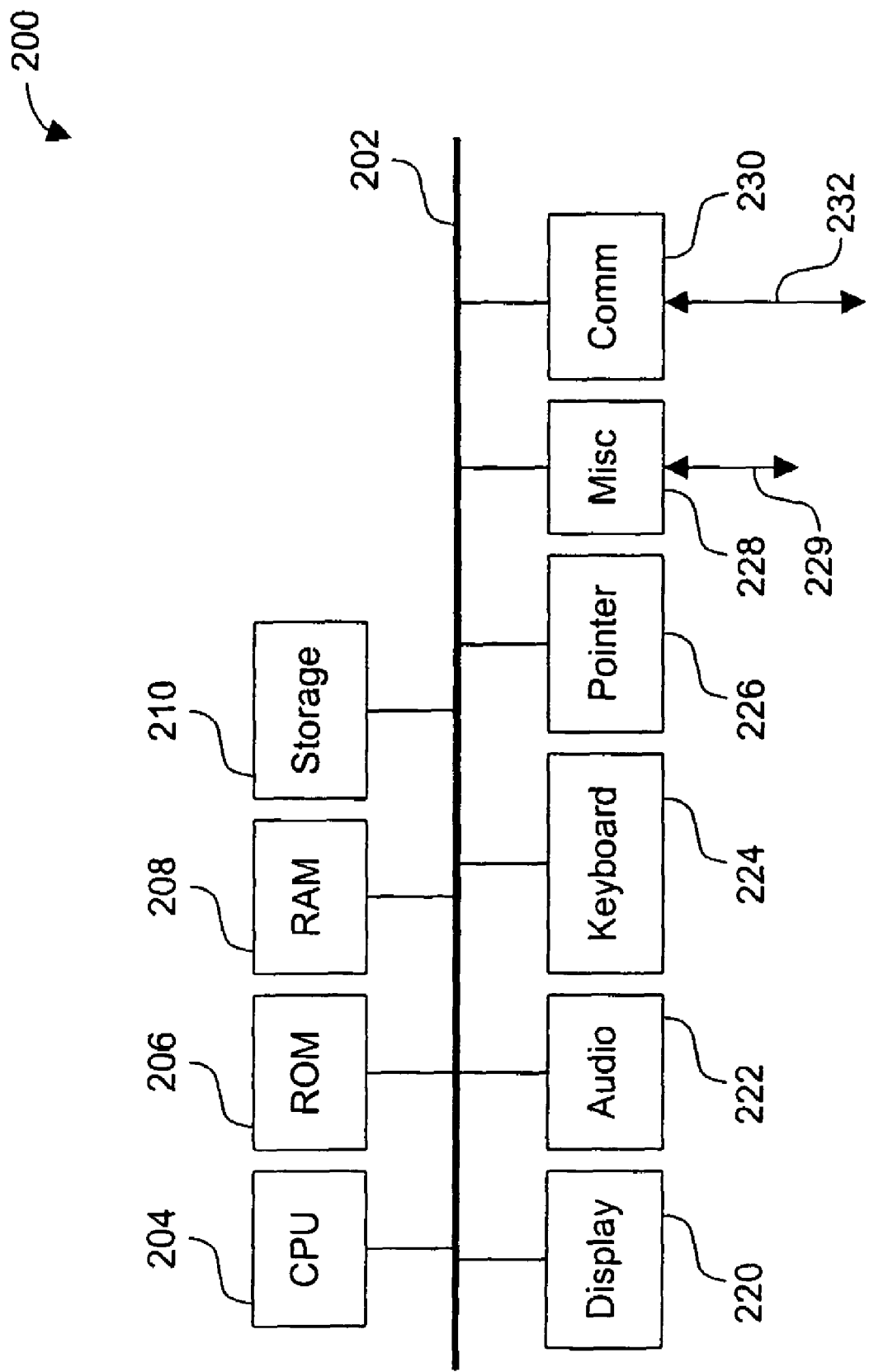
FIG. 2 is a block diagram of a computer system in which embodiments of the present invention may be implemented.

FIG. 2 illustrates a computer system 200 in block diagram form, which may be representative of any of the clients and servers shown in FIG. 1, and which may be representative of an embodiment of the invention. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), etc. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Use of the words "one embodiment", or "an embodiment", or similar language does not imply that there is only a single embodiment of the invention, but rather indicates that in the particular embodiment being discussed it is one of several possible embodiments.

Thus, a method and apparatus for nonlinear multiple motion model and moving boundary extraction have been described.

What is claimed is:

1. A computerized method comprising:
   receiving motion prediction errors corresponding to motion blocks in an input frame that occurs within a video sequence of frames, wherein the received motion prediction errors are associated with a single-motion model;
   selecting a motion block if the corresponding received motion prediction error satisfies a predetermined criterion;
   calculating a plurality of motion prediction errors for the selected motion block relative to a first reference frame and relative to a second reference frame, wherein the input frame, the first reference frame, and the second reference frame are different frames in the video sequence;
   partitioning, by a computer, the selected motion block into an arrangement that minimizes a value of each of the plurality of the motion prediction errors, the arrangement comprising a first region of pixels that are predicted relative to the first reference frame and a second region of pixels that are predicted relative to the second reference frame, wherein the first reference frame is a past frame and the second reference frame is a future frame;
   deriving a multiple-motion model for the selected motion block from the arrangement; and
   encoding the input frame by using both the multiple-motion model and the single-motion model.

2. The computerized method of claim 1, wherein deriving the multiple-motion model comprises:
   estimating a boundary of a moving object in the video sequence based on an intersection of the first and second regions.

3. The computerized method of claim 2, wherein the arrangement further comprises a mixture region of pixels that are predicted from a combination of the first and second reference frames, and wherein estimating the boundary comprises:
   changing a pixel in the mixture region to be predicted from a single reference frame.

4. The computerized method of claim 3, wherein estimating the boundary further comprises:
   identifying pixels in the mixture region where a time variable $t'=F(s)=-0.5$, where $F(s)$ is a nonlinear function, $s$ is a boundary model $B(x, y)$, $x$ and $y$ are pixel coordinates, $t'=-1$ for a pixel predicted relative to a past frame, $t'=0$ for a pixel predicted relative to a future frame, and t'∈(−1,0) for a pixel in the mixture region.

5. The computerized method of claim 4, wherein the non-linear function is given by $$F(s) = \frac{(\tanh((s+0.5)/w) - 1)}{2}$$

where w is a width of the boundary and controls how many pixels are in the mixture region.

6. The computerized method of claim 4, wherein the boundary model is given by $$B(x,y) = gx + hy + \alpha x^2 + \beta y^2 + i$$

where g, h, α, β, and i are predetermined parameters.

7. The computerized method of claim 3, wherein calculating the plurality of motion prediction errors comprises:
calculating motion vectors ($v_x$, $v_y$) using a six-parameter (a, b, c, d, e, f) affine motion equation that includes a time variable t' as given by $$x' = ax + by + c + (a'x + b'y + c')(t'+1)$$

$$y' = dx + ey + f + (d'x + e'y + f')(t'+1)$$

where x and y locate a pixel in the input frame, x' and y' locate a corresponding pixel in a reference frame, t'=−1 for a pixel predicted relative to a past frame, t'=0 for a pixel predicted relative to a future frame,
wherein a motion vector for a pixel predicted relative to a past frame is $$v_x = x' - x = (a-1)x + by + c$$

$$v_y = y' - y = dx + (e-1)y + f$$

and for a motion vector for a pixel predicted relative to a future frame is $$v_x = (a+a'-1)x + (b+b')y + c + c'$$

$$v_y = (d+d')x + (e+e'-1)y + f + f'.$$

8. The computerized method of claim 7, wherein a pixel in the input frame is predicted by applying the motion vectors for both the past and future frames.

9. The computerized method of claim 1, wherein the reference frames are selected from the group consisting of past frames and future frames relative to the input frame within the video sequence.

10. A computer-readable storage medium having executable instructions that cause a process to execute a method comprising:
receiving motion prediction errors corresponding to motion blocks in an input frame that occurs within a video sequence of frames, wherein the received motion prediction errors are associated with a single-motion model;
selecting a motion block if the corresponding received motion prediction error satisfies a predetermined criterion;
calculating a plurality of motion prediction errors for the selected motion block relative to a first reference frame and relative to a second reference frame, wherein the input frame, the first reference frame, and the second reference frame are different frames in the video sequence;
partitioning the selected motion block into an arrangement that minimizes a value of each of the plurality of the motion prediction errors, the arrangement comprising a first region of pixels that are predicted relative to the first reference frame and a second region of pixels that are predicted relative to the second reference frame, wherein the first reference frame is a past frame and the second reference frame is a future frame;
deriving a multiple-motion model for the selected motion block from the arrangement; and
encoding the input frame by using both the multiple-motion model and the single-motion model.

11. The computer-readable storage medium of claim 10, wherein deriving the multiple-motion model comprises:
estimating a boundary of a moving object in the video sequence based on an intersection of the first and second regions.

12. The computer-readable storage medium of claim 11, wherein the arrangement further comprises a mixture region of pixels that are predicted from a combination of the first and second reference frames, and wherein estimating the boundary comprises:
changing a pixel in the mixture region to be predicted from a single reference frame.

13. The computer-readable storage medium of claim 10, wherein the reference frames are selected from the group consisting of past frames and future frames relative to the input frame within the video sequence.

14. A system comprising:
logic to receive motion prediction errors corresponding to motion blocks in an input frame that occurs within a video sequence of frames, wherein the received motion prediction errors are associated with a single-motion model;
logic to select a motion block if the corresponding received motion prediction error satisfies a predetermined criterion;
logic to calculate a plurality of motion prediction errors for the selected motion block relative to a first reference frame and relative to a second reference frame, wherein the input frame, the first reference frame, and the second reference frame are different frames in the video sequence;
logic to partition the selected motion block into an arrangement that minimizes a value of each of the plurality of the motion prediction errors, the arrangement comprising a first region of pixels that are predicted relative to the first reference frame and a second region of pixels that are predicted relative to the second reference frame, wherein the first reference frame is a past frame and the second reference frame is a future frame;
logic to derive a multiple-motion model for the selected motion block from the arrangement; and
logic to encode the input frame by using both the multiple-motion model and the single-motion model.

15. The system of claim 14, wherein the logic to derive the multiple-motion model further estimates a boundary of a moving object in the video sequence based on an intersection of the first and second regions.

16. The system of claim 15, wherein the arrangement further comprises a mixture region of pixels that are predicted from a combination of the first and second reference frames, and wherein the logic to derive the multiple-motion model further changes a pixel in the mixture region to be predicted from a single reference frame when estimating the boundary.

17. The system of claim 14, wherein the reference frames are selected from the group consisting of past frames and future frames relative to the input frame within the video sequence.

18. The system of claim 14 further comprising:
logic to decode the video sequence according to both the multiple-motion model and the single-motion model.

* * * * *